United States Patent
Wang et al.

(10) Patent No.: US 11,349,314 B2
(45) Date of Patent: May 31, 2022

(54) DISTRIBUTED BATTERY POWER ESTIMATION WITH WEAKER CELL MONITORING

(71) Applicant: GM GLOBAL TECHNOLOGY OPERATIONS LLC, Detroit, MI (US)

(72) Inventors: Yue-Yun Wang, Troy, MI (US); Garrett M. Seeman, Novi, MI (US); Jeffrey S. Piasecki, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 172 days.

(21) Appl. No.: 16/675,747

(22) Filed: Nov. 6, 2019

(65) Prior Publication Data

US 2021/0135461 A1    May 6, 2021

(51) Int. Cl.
*H02J 7/00* (2006.01)
*H01M 50/20* (2021.01)

(52) U.S. Cl.
CPC ......... *H02J 7/00041* (2020.01); *H01M 50/20* (2021.01); *H02J 7/0018* (2013.01); *H02J 7/0021* (2013.01); *H02J 7/0078* (2013.01)

(58) Field of Classification Search
USPC ........................................................ 320/121
See application file for complete search history.

(56) References Cited

U.S. PATENT DOCUMENTS

| | | | | |
|---|---|---|---|---|
| 8,471,529 B2* | 6/2013 | Vance | ............... | H02J 7/0026 320/134 |
| 2012/0161715 A1* | 6/2012 | Park | ............... | H02J 7/0016 320/136 |
| 2012/0194133 A1* | 8/2012 | Posamentier | ......... | H02J 7/0018 320/116 |
| 2013/0229143 A1* | 9/2013 | Chou | ............... | H02J 7/00047 320/107 |
| 2016/0172875 A1* | 6/2016 | Lee | ............... | H02J 7/0014 320/118 |
| 2019/0131809 A1* | 5/2019 | Park | ............... | H02J 7/0047 |

* cited by examiner

*Primary Examiner* — Samuel Berhanu
(74) *Attorney, Agent, or Firm* — Quinn IP Law (57) ABSTRACT

A distributed battery power system having a battery pack and a battery controller. The battery pack has: a plurality of cells configured to generate a plurality of cell voltages; a voltage current temperature module electrically connected to the plurality of cells; and a plurality of isolation switch sets electrically connected between the plurality of cells. The battery controller is in communication with the voltage current temperature module, and operable to: send a status request to the voltage current temperature module; receive the plurality of cell voltages from the voltage current temperature module in response to the status request; determine if the plurality of cells includes one or more problem cells in response to the plurality of cell voltages; and perform an action in response to determining that the one or more problem cells are present to prevent damage to the one or more problem cells.

20 Claims, 8 Drawing Sheets

DISTRIBUTED BATTERY POWER ESTIMATION WITH WEAKER CELL MONITORING

INTRODUCTION

The present disclosure relates to a system and a method for estimating distributed battery power with weaker cell monitoring.

When a weak cell exists in a battery pack or a battery module, a voltage drop occurs, and the output voltage of the cell is less than normal under a current load due to internal changes in the cell. A larger voltage drop in a cell, or cell voltage droop often occurs due to battery cell manufacture defects or battery short circuits. As a result, a total amount of power that the battery pack may deliver is limited. Without knowing the limit, if a vehicle demands more power than the limit, additional stress will be loaded on the weak cell. The additional stress reduces a life of the battery pack due to the weak cell deteriorating faster than the surrounding cells. What is desired is a technique to monitor the battery pack for problem cells, estimate the power available from the battery pack in the presence of the problem cells and perform actions that prevent damage of the problem cells.

SUMMARY

A distributed battery power system is provided herein. The distributed battery power system generally comprises a battery pack and a battery controller. The battery pack has: a plurality of cells configured to generate a plurality of cell voltages; a voltage current temperature module electrically connected to the plurality of cells; and a plurality of isolation switch sets electrically connected between the plurality of cells. The battery controller is in communication with the voltage current temperature module, and operable to: send a status request to the voltage current temperature module; receive the plurality of cell voltages from the voltage current temperature module in response to the status request; determine if the plurality of cells includes one or more problem cells in response to the plurality of cell voltages; and perform an action in response to determining that the one or more problem cells are present to prevent damage to the one or more problem cells.

In one or more embodiments of the distributed battery power system, the one or more problem cells include at least one weak cell, and the at least one weak cell is detected based on one or more of a state of charge, a capacity and a state of health of the at least one weak cell.

In one or more embodiments of the distributed battery power system, the one or more problem cells include at least one drooping cell, and the at least one drooping cell is detected in response to a difference between neighboring cell voltages exceeding a standard deviation threshold as a function of time.

In one or more embodiments of the distributed battery power system, the battery controller is further operable to estimate a total power available from the battery pack while the one or more problem cells are electrically active in the battery pack.

In one or more embodiments of the distributed battery power system, the battery controller is further operable to estimate a safe current limit and one or more safe voltage limits of the one or more problem cells based on a cell model; and estimate a total power available from the battery pack based on the safe current limit and the one or more safe voltage limits.

In one or more embodiments of the distributed battery power system, the battery pack is one of a single battery pack or comprises two battery packs electrically connected in parallel.

In one or more embodiments of the distributed battery power system, the action is controlling the plurality of isolation switch sets to electrically isolate the one or more problem cells from the battery pack.

In one or more embodiments of the distributed battery power system, the action is derating the battery pack to limit a charging current and a discharging current flowing through the one or more problem cells.

In one or more embodiments of the distributed battery power system, the battery pack and the battery controller are mountable in a vehicle.

A method for monitoring a distributed batter power system is provided herein. The method comprises: sending a status request from a battery controller to a battery pack, wherein the battery pack has a plurality of cells configured to generate a plurality of cell voltages, a voltage current temperature module electrically connected to the plurality of cells, and a plurality of isolation switch sets electrically connected between the plurality of cells; receiving the plurality of cell voltages at the battery controller from the voltage current temperature module in response to the status request; determining in the battery controller if the plurality of cells includes one or more problem cells in response to the plurality of cell voltages; and performing an action in response to determining that the one or more problem cells are present to prevent damage to the one or more problem cells.

In one or more embodiments of the method, the one or more problem cells include at least one weak cell, and the at least one weak cell is detected based on one or more of a state of charge, a capacity and a state of health of the at least one weak cell.

In one or more embodiments of the method, the one or more problem cells include at least one drooping cell, and the at least one drooping cell is detected in response to a difference between neighboring cell voltages exceeding a standard deviation threshold as a function of time.

In one or more embodiments, the method further comprises estimating in the battery controller a total power available from the battery pack while the one or more problem cells are electrically active in the battery pack.

In one or more embodiments, the method further comprises estimating a safe current limit and one or more safe voltage limits of the one or more problem cells based on a cell model; and estimating a total power available from the battery pack based on the safe current limit and the one or more safe voltage limits.

In one or more embodiments of the method, the battery pack is one of a single battery pack or comprises two battery packs electrically connected in parallel.

In one or more embodiments of the method, the action is controlling the plurality of isolation switch sets to electrically isolate the one or more problem cells from the battery pack.

In one or more embodiments of the method, the action is derating the battery pack to limit a charging current and a discharging current flowing through the one or more problem cells.

In one or more embodiments of the method, the method is performed in a vehicle.

A vehicle is provided herein. The vehicle comprises a battery pack, a motor and a battery controller. The battery pack has: a plurality of cells configured to generate a plurality of cell voltages; a voltage current temperature module electrically connected to the plurality of cells; and a plurality of isolation switch sets electrically connected between the plurality of cells. The motor is powered by the battery pack, and operable to propel the vehicle. The battery controller is in communication with the voltage current temperature module, and operable to: send a status request to the voltage current temperature module; receive the plurality of cell voltages from the voltage current temperature module in response to the status request; determine if the plurality of cells includes one or more problem cells in response to the plurality of cell voltages; and perform an action in response to determining that the one or more problem cells are present to prevent damage to the one or more problem cells.

In one or more embodiments of the method, the action is one or more of: controlling the plurality of isolation switch sets to electrically isolate the one or more problem cells from the battery pack; and derating the battery pack to limit a charging current and a discharging current flowing through the one or more problem cells.

The above features and advantages and other features and advantages of the present disclosure are readily apparent from the following detailed description of the best modes for carrying out the disclosure when taken in connection with the accompanying drawings.

DETAILED DESCRIPTION

A battery pack power may be estimated based on a constraint of how much power may be delivered by one or more weaker cells and/or one or more drooping cells. A battery model of the battery pack generally comprises distributed cell models either (i) series connected or (ii) series and parallel connected. A problem cell model for one or several weaker cells and/or drooping cells may be similar to the battery model with different coefficients. A main battery pack model generally comprises the battery model without the problem cells being considered. Total battery pack power may be estimated based on distributed power estimation techniques using one or more of the problem cell models and the main battery pack model.

A statistical based detection method may be used to detect one or more problem cells. A battery state estimation may be applied to the problem cells and the remaining good cells in the battery pack to form a distributed battery system model. Based on the distributed battery system model, the battery pack power may be accurately estimated with the constraints of the problem cell currents, voltages and state of charge limits, depending on the battery system configuration. The problem cells may either be electrically isolated from the good cells and/or the vehicle power may be derated (e.g., lower the rated capability of the electrical power available to the vehicle). Either approach generally extends the life of the battery pack and/or may prevent cell damage from further developing.

Figure 1:
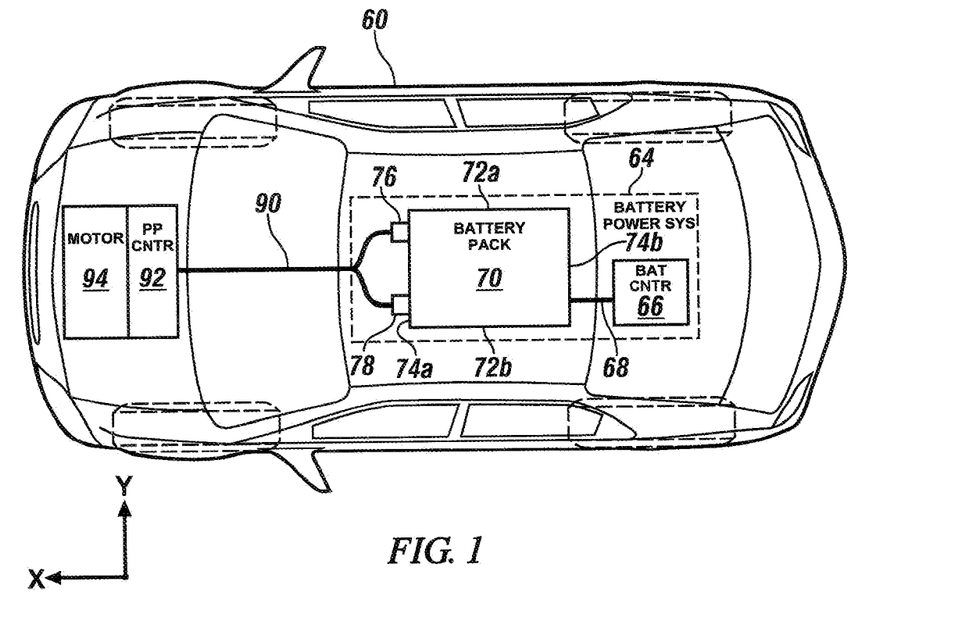
FIG. 1 is a schematic plan diagram illustrating a context of a system.

Referring to FIG. 1, a schematic plan diagram illustrating a context of a system is shown. The system may implement a vehicle 60. The vehicle 60 generally comprises a distributed battery power system 64, a harness 90, a power-pack controller 92 and one or more motors 94 (one motor 94 is shown for clarity). The distributed battery power system 64 may include a battery controller 66, a communication bus 68 and one or more battery packs 70 (one battery pack 70 is shown for clarity). The battery pack 70 may include opposing pack sides 72a-72b, opposing pack ends 74a-74b, a positive battery pack terminal 76 and a negative battery pack terminal 78. For the purposes of explanation, a front of the vehicle 60 may be aligned in a positive X direction. A right side of the vehicle 60 (as seen looking down at a top of the vehicle 60) may be aligned in a positive Y direction. The positive Y direction may be perpendicular to the positive X direction.

The vehicle 60 may include, but is not limited to, mobile objects such as automobiles, trucks, motorcycles, boats, trains and/or aircraft. In some embodiments, the vehicle 60 may include stationary objects such as billboards, kiosks, power back-up systems (e.g., uninterruptible power supplies) and/or marquees. Other types of vehicles 60 may be implemented to meet the design criteria of a particular application.

The distributed battery power system 64 is generally operational to store energy used by the power-pack controller 92 and the motor 94. In a charging mode, the distributed battery power system 64 may receive electrical current from the power-pack controller 92 or from a charging station. In a discharging mode, the distributed battery power system 64 may provide electrical current to the power-pack controller 92 to operate the motor 94.

The battery controller 66 may be implemented as a vehicle interface control module (VICM). The battery controller 66 is generally operational to control one or more profiles and/or modes of the battery pack 70. The profiles may include a pack charging profile, a fast charging profile and/or a pack discharging profile. The profiles generally establish maximum current rates, maximum voltages, minimum voltages and maximum temperatures for the battery pack 70. The profiles may monitor the state of charge, and perform cell balancing. The profiles may be temperature dependent, mileage (e.g., odometer-measured distances) dependent and/or operational life (e.g., time) dependent.

The battery controller 66 may also be operational to send a status request to the battery pack 70, receive the plurality of voltages from the battery pack 70 in response to the status request, determine if the plurality of cells includes one or more problem cells, and perform an action in response to determining that the one or more problem cells are present to prevent damage to the one or more problem cells. In some situations, the action may include controlling a plurality of isolation switch sets to electrically isolate the one or more problem cells from the battery pack. In some situations, the action may include derating the battery pack 70 to limit the charging current and the discharging current flowing through the one or more problem cells. In particular, the battery controller may be operable to estimate a safe current limit and one or more safe voltage limits of the one or more problem cells based on the problem cell model and subsequently estimate a total power available from the battery pack based on the safe current limit and the one or more safe voltage limits to prevent further damage to the cells and/or thermal runaway conditions.

The communication bus 68 may implement a bidirectional bus. The communication bus 68 is generally operational to transfer data between the battery controller 66 and the battery pack 70. The data may include but is not limited to status requests and measured cell voltages. Other types of data may be implemented to meet the design criteria of a particular application.

The status requests may be sent from the battery controller 66 to the battery pack 70. The status request generally asks for a reply of a measured cell voltage of multiple cells in the battery pack 70. The measured voltages may be transferred from the battery pack 70 to the battery controller 66 in response to the status requests.

The battery pack 70 (or individual ones of multiple battery packs 70) may be a high-voltage battery pack configured to store electrical energy. The battery pack 70 is generally operational to receive electrical power from the power-pack controller 92 and provide electrical power to the power-pack controller 92. The battery pack 70 may include multiple battery modules electrically connected in series and/or in parallel between the positive battery pack terminal 76 and the negative battery pack terminal 78. In various embodiments, the battery pack 70 may provide approximately 200 to 1,000 volts DC (direct current) electrical potential between the positive battery pack terminal 76 and the negative battery pack terminal 78. Other battery voltages may be implemented to meet the design criteria of a particular application. The pack sides 72a-72b may face the positive Y direction and the negative Y direction. The pack ends 74a-74b may face the positive X direction and the negative X direction. The positive battery pack terminal 76 and the negative battery pack terminal 78 may be physically and electrically connected to the harness 90.

The harness 90 may be an electrical harness. The harness 90 is generally operational to carry electrical power between the power-pack controller 92 and the battery pack 70. In the charging mode, the harness 90 may transfer the electrical power from the power-pack controller 92 to the battery pack 70. In the discharging mode, the electrical power may flow along the harness 90 from the battery pack 70 to the power-pack controller 92.

The power-pack controller 92 may be implemented as a controller that exchanges electrical power between the battery pack 70 and the motor 94. The power-pack controller 92 is generally operational to transfer electrical power from an alternator to the battery pack 70 in the charging mode to charge the battery pack 70. The power-pack controller 92 may draw electrical power from the battery pack 70 in the discharge mode. The electrical power received from the battery pack 70 may be used to power the motor 94 and/or other loads within the vehicle 60.

The motor 94 (or individual ones of multiple motors 94) may be an electric motor. The motor 94 is generally operational to provide rotation and torque to drive wheels of the vehicle 60 to propel the vehicle 60 about the ground and/or roads. The electrical power consumed by the motor 94 may be provided by the battery pack 70 and/or the alternator of the vehicle 60 under the control of the power-pack controller 92.

Figure 2:
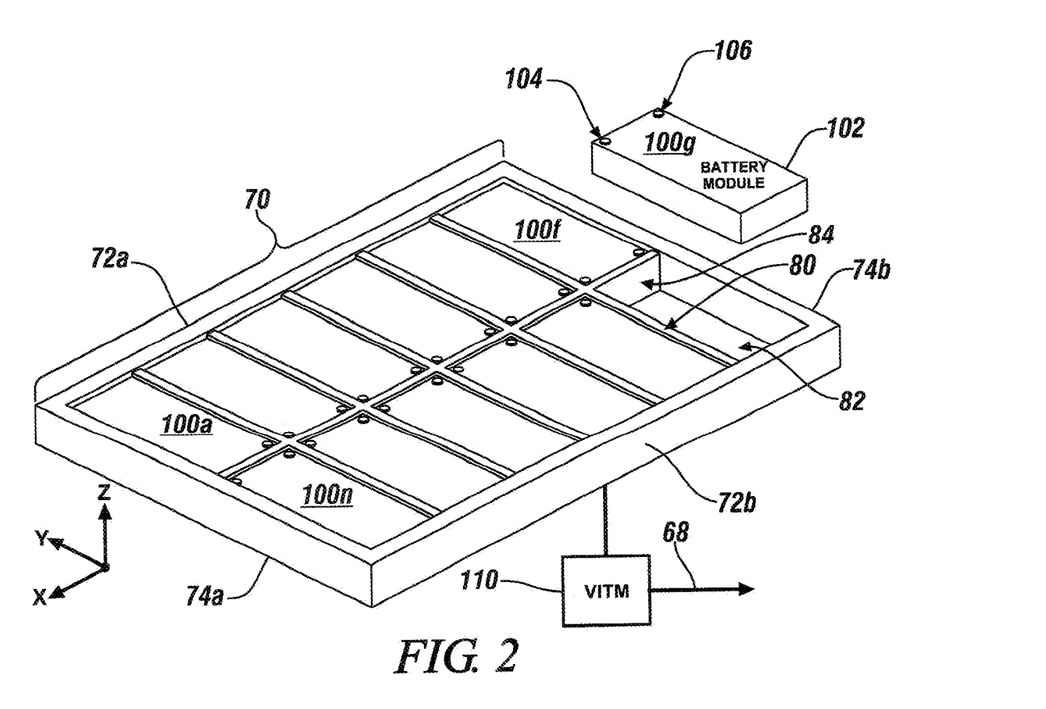
FIG. 2 is a schematic partially exploded perspective diagram of a battery pack in accordance with an exemplary embodiment.

Referring to FIG. 2, a schematic partially exploded perspective diagram of an example implementation of the battery pack 70 is shown in accordance with an exemplary embodiment. The battery pack 70 generally comprises the pack sides 72a-72b, the pack ends 74a-74b, the positive battery pack terminal 76 (see FIG. 1), the negative battery pack terminal 78 (see FIG. 1), an optional cross-car beam 80, a pack floor 82, an optional fore/aft spine 84, multiple battery modules 100a-100n and a voltage current temperature module (VITM) 110. Individual ones of the battery modules 100a-100n generally comprise a housing 102, a positive battery module terminal 104 and a negative battery module terminal 106. In various embodiments, the battery module terminals 104-106 may be mounted on the housing 102 near one of the battery module ends. In other embodiments, the battery module terminals 104-106 may be mounted on other components within the battery modules 100a-100n (e.g., on interconnect circuit boards) and exposed through opening(s) in the housing 102.

The battery modules (or circuits or units) 100a-100n may be connected in series between the positive battery pack terminal 76 and the negative battery pack terminal 78. A height of the battery pack 70 may be aligned in a positive Z direction. The positive Z direction may be normal to a plane defined by the X direction and the Y direction.

The voltage current temperature module (or circuit or unit) 110 may be an internal controller for the battery pack 70. The voltage current temperature module 110 is generally operational to monitor operations of the battery pack 70 in response to the cell voltages and the voltage across the battery pack 70, the current sent from and received by the battery pack 70 and a temperature or multiple temperatures at multiple locations of the battery pack 70. The voltage current temperature module 110 may sense a temperature of the battery pack 70 using a thermistor or a thermocouple in either an interconnect circuit board or as a component on a wiring harness mounted to the battery pack 70. The voltage current temperature module 110 may be connected to the battery controller 66 through the communication bus 68.

Figure 3:
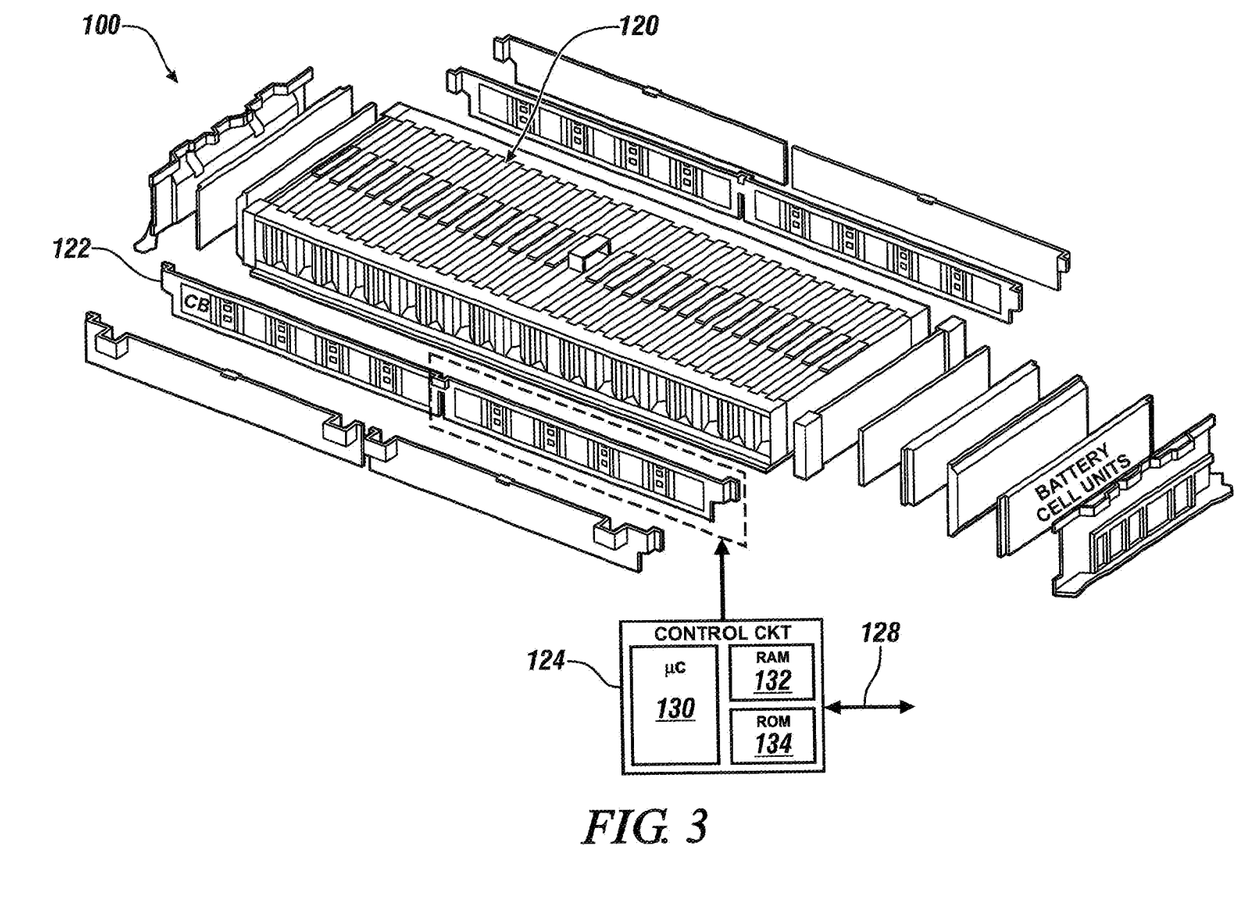
FIG. 3 is a schematic partially exploded perspective diagram of a battery module in accordance with an exemplary embodiment.

Referring to FIG. 3, a schematic partially exploded perspective diagram of a battery module 100 is shown in accordance with an exemplary embodiment. The battery module 100 may be representative of the individual battery modules 100a-100n. The battery module 100 generally comprises multiple battery cell units 120, an interconnect circuit board 122, a control circuit 124 and a local bus 128. The control circuit 124 may be mounted on the interconnect circuit board 122. The control circuit 124 generally comprises a microcontroller 130, a random-access memory (RAM) 132 and a read-only memory (ROM) 134.

The battery cell units 120 may be electrical cells configured to store electrical energy. The battery cell units 120 are generally operational to receive electrical power while in the charging mode and provide electrical power while in the discharge mode. In some embodiments, the battery cell units 120 may be configured as 3.5 volt to 4.2 volt DC cells. Other battery cell unit voltages may be implemented to meet design criteria of a particular application. Several (e.g., 3) battery cell units 120 generally may be electrically grouped together in parallel as a cell.

The interconnect circuit board 122 may be a multi-layer circuit board. The interconnect circuit board 122 is generally operational to provide electrical paths for electrical power and electrical signals between the battery cell units 120, and the control circuit 124.

The control circuit 124 may be implemented as a controller. The control circuit 124 may include a built-in memory (132 and 134). The control circuit 124 may also have an interface to the local bus 128 and multiple input/output circuits. The control circuit 124 is generally operational to provide active electronics to the interconnect circuit board 122 that provides communication between the voltage current temperature module 110 and the battery module 100

The local bus 128 is configured as a bidirectional bus. The local bus 128 is generally operational to provide data between the control circuit 124 and the voltage current temperature module 110.

The microcontroller 130 is generally operational to communicate with the voltage current temperature module 110 via the local bus 128. The microcontroller 130 may also be operational to write and read the cell voltage data to and from the random-access memory 132.

The random-access memory 132 may be a volatile and/or a nonvolatile memory. The random-access memory 132 is generally operational to store data consumed and produced by the microcontroller 130. By way of example, the random-access memory 132 may store module-specific information used by the microcontroller 130. In some embodiments, the random-access memory 132 may also hold the cell voltage data.

The read-only memory 134 may have a read-only policy, a write-once read-many policy and/or a nonvolatile memory policy. The read-only memory 134 is generally operational to store software (or code or firmware) executed by the microcontroller 130. The read-only memory 134 may be programmed with module-specific parameters that the vehicle 60 and/or the battery controller 66 may apply to performance-related logic/processes. For example, the read-only memory 134 may contain data/programs for state of charge (SOC) calculations, cell balancing calculations, charge limits and/or discharge limits.

Figure 4:
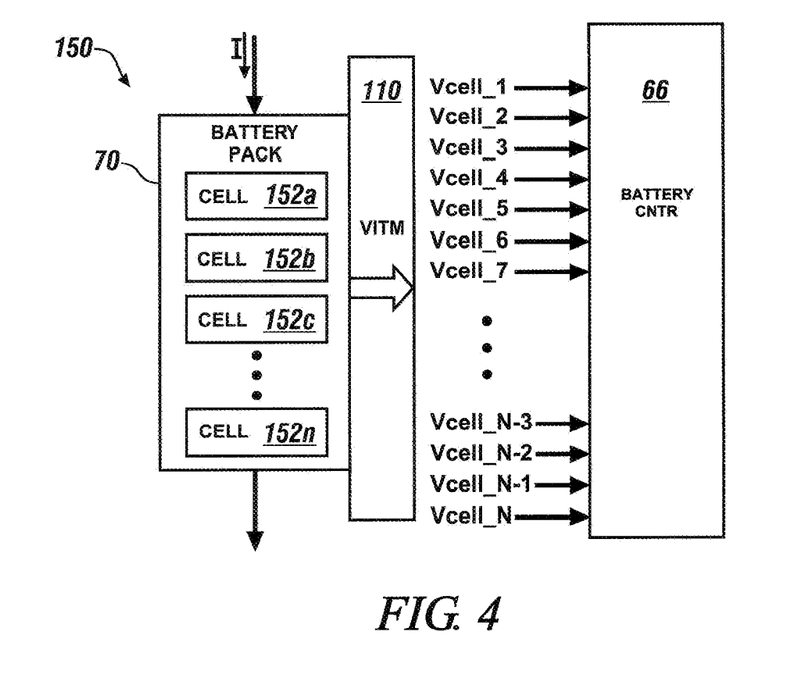
FIG. 4 is a schematic diagram for detecting one or more problem cells in accordance with an exemplary embodiment.

Referring to FIG. 4, a schematic diagram of an example configuration 150 for detecting one or more problem cells (e.g., one or more weak cells and/or drooping cells) is shown in accordance with an exemplary embodiment. The configuration 150 generally comprises the battery pack 70, the voltage current temperature module 110 and the battery controller 66.

The battery pack 70 may comprise multiple isolatable cells 152a-152n in series connection. In an example embodiment, the battery pack 70 generally includes three battery cell units 120 per cell 152a-152n and ninety-six cells per pack 70 (e.g., a 3p96s configuration). Other configurations of the cells 152a-152n and/or the battery pack 70 may be implemented to meet the design criteria of a particular application. A current signal (e.g., I) may flow through the battery pack 70. The current signal I may represent either a charging current or a discharging current.

Voltages of the individual cells 152a-152n may be measured by the voltage current temperature module 110. The measured cell voltages (e.g., Vcell_1 to Vcell_N) may be presented to the battery controller 66 via the communication bus 68.

The battery controller 66 may calculate an array of voltage residuals (e.g. $R_i(t)$) from the cell voltages Vcell_1 to Vcell_N per formula 1 as follows:

$$Ri(t) = Vcell\_i(t) - Vcell\_(i-1)(t), \text{ for } i=2 \text{ to } N \quad (1)$$

The individual voltage residuals $R_i(t)$ may be a cell voltage difference between two neighboring cells 152a-152n.

The battery controller 66 may calculate standard deviations (e.g., $\sigma(t)$) of the ensemble per formula 2 over the residuals as follows:

$$\sigma(t) = STD([R_1(t)R_2(t) \ldots R_N(t)]) \quad (2)$$

Where STD( ) is a standard deviation operation. A detection chart defining multiple thresholds may be applied to detect a problem cell. If a voltage residual RAO is in a condition where both $R_j(t) < -k\sigma$ and $R_{j+1}(t) > +k\sigma(t)$ are true, where k is constant, the j-th cell may be detected as a weak cell or a drooping cell (e.g., a problem cell). A similar technique may be applied to detect a lowest state of charge that may be beyond a cell balance capability of the battery controller 66.

Figure 5:
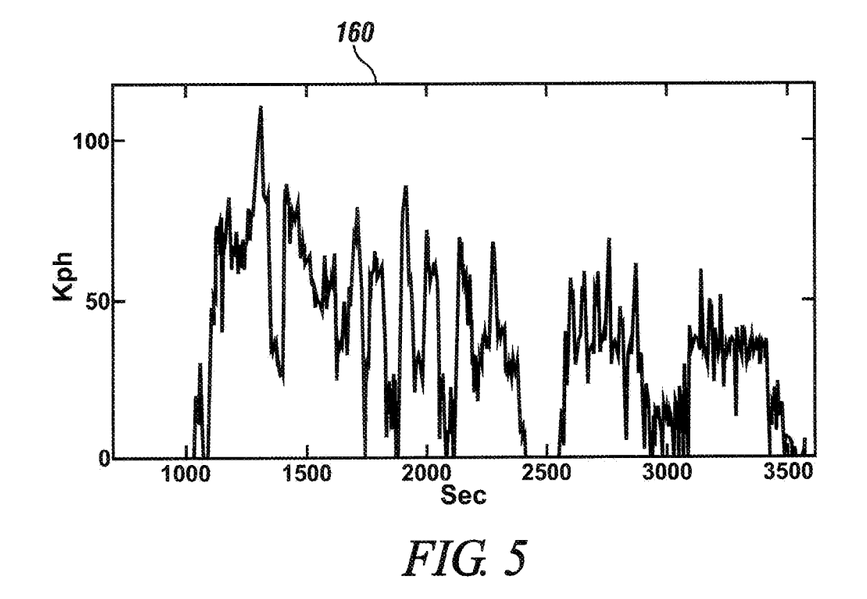
FIG. 5 is a schematic diagram of a vehicle speed as a function of time in accordance with an exemplary embodiment.

Referring to FIG. 5, a schematic diagram of a graph 160 of an example vehicle speed as a function of time is shown in accordance with an exemplary embodiment. The x-axis is shown in units of seconds (sec). The y-axis is shown in units of kilometers per hour (kph). The speed of the vehicle 60 generally changes over time. The speed of the vehicle 60 in the example may vary from stopped (e.g., zero speed) to a high speed (e.g., 110 kph). Other profiles of the vehicle speed generally exist.

Figure 6:
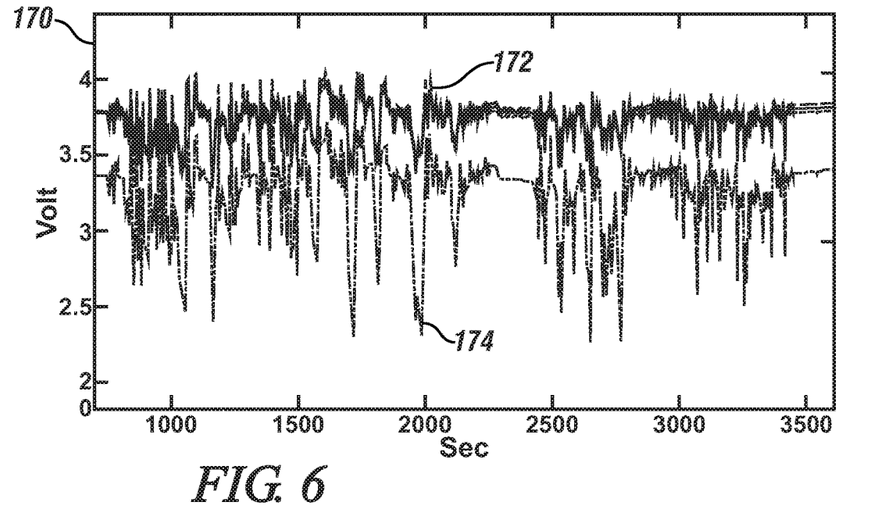
FIG. 6 is a schematic diagram of a graph of cell voltage as a function of time in accordance with an exemplary embodiment.

Referring to FIG. 6, a schematic diagram of a graph 170 of an example cell voltage as a function of time is shown in accordance with an exemplary embodiment. The x-axis is shown in units of seconds. The y-axis is shown in units of volts. A first curve 172 generally illustrates normal cell voltages of normal cells 152a-152n in the battery pack 70 over time. A second curve 174 may show a cell voltage of a drooping cell in the battery pack 70 over time. A low voltage threshold (e.g., 2.0 volts to 2.5 volts) may be established as the discharge voltage limit for a problem cell with a drooping voltage. As shown in the example, the second curve 174 may fall below a 2.5 voltage threshold momentarily on multiple occasions.

Figure 7:
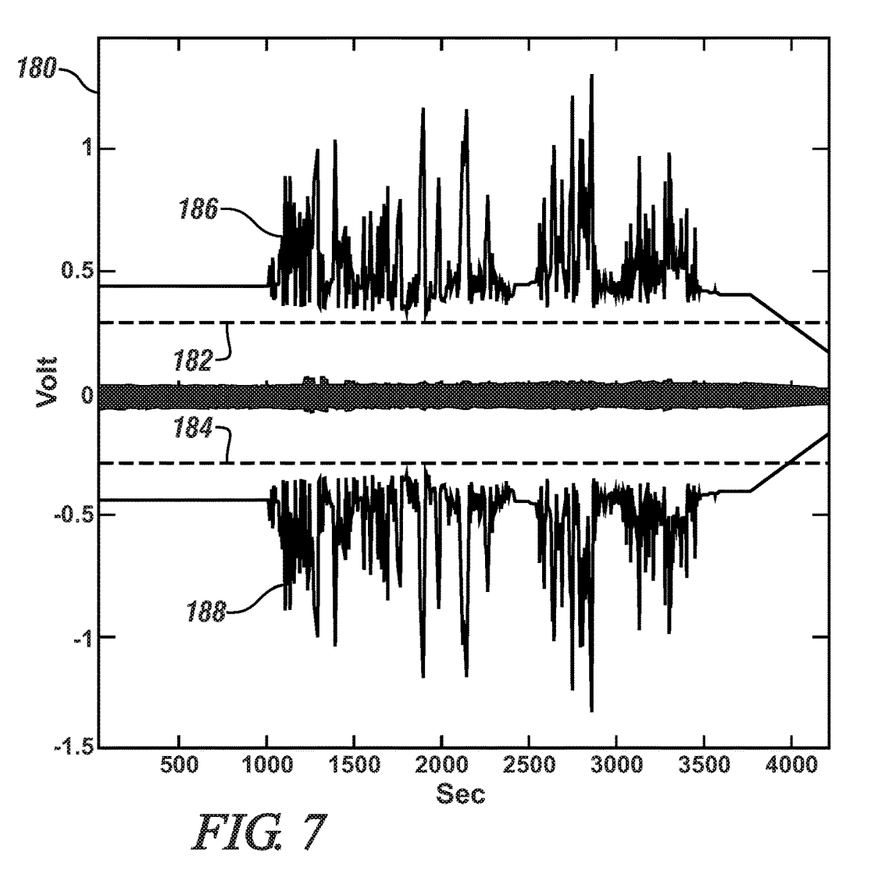
FIG. 7 is a schematic diagram of a graph of standard deviations of voltage residuals as a function of time in accordance with an exemplary embodiment.

Referring to FIG. 7, a schematic diagram of a graph 180 of standard deviations of voltage residuals Ri(t) as a function of time is shown in accordance with an exemplary embodiment. The x-axis is shown in units of seconds. The y-axis is shown in units of volts. The graph 180 may establish the thresholds of the detection chart. A pair of voltage thresholds 182 and 184 may be calculated to detect a weaker cell or drooping cells. The positive voltage threshold 182 may be set at a positive standard deviation (e.g., $+k\sigma(t)$) above zero volts. The negative voltage threshold 184 may be set at a negative standard deviation (e.g., $-k\sigma(t)$) zero volts. A first curve 186 calculated between a cell 2 and a cell 3 illustrates an example voltage residual (e.g., $R_3(t)$) where the cell 2 is drooping. A second curve 188 calculated between a cell 1 and the cell 2 illustrates an example voltage residual (e.g., $R_2(t)$) where the cell 2 is drooping. In response to one or both (i) the first curve 186 rising above the positive voltage threshold 182 and (ii) the second curve 188 falling below the negative voltage threshold 184, the battery controller 66 may conclude that the cell 2 is a weaker cell or drooping cell.

Figure 8:
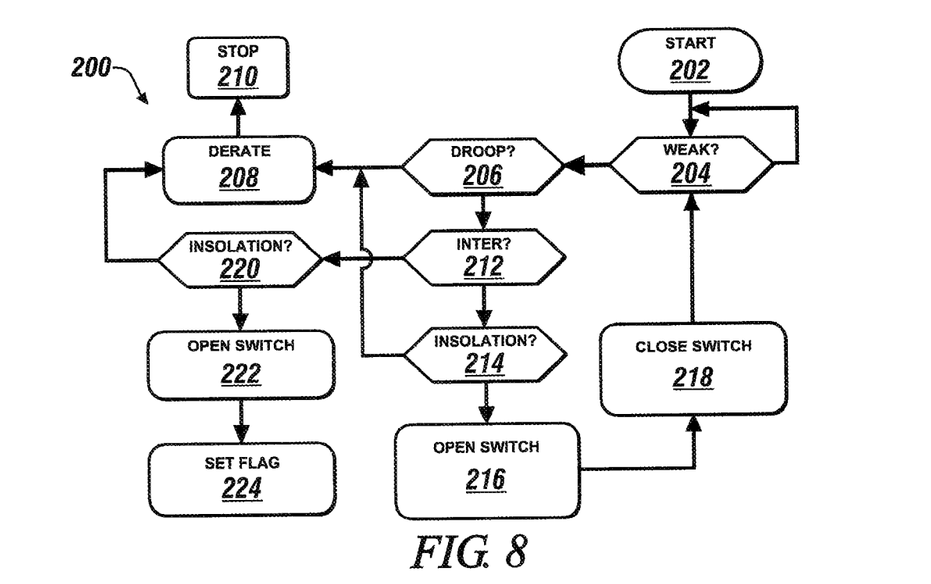
FIG. 8 is a schematic flow diagram of a method for fail-safe battery power management in accordance with an exemplary embodiment.

Referring to FIG. 8, a schematic flow diagram of an example implementation of a method 200 for fail safe battery power management is shown in accordance with an exemplary embodiment. The fail-safe battery power management method (or process) 200 may be implemented by the battery pack 70, the voltage current temperature module 110 and the battery controller 66. The fail-safe battery power management method 200 generally comprises a step 202, a decision step 204, a decision step 206, a step 208, a step 210, a decision step 212, a decision step 214, a step 216, a step 218, a decision step 220, a step 222, and a step 224. The sequence of steps 202 to 224 is shown as a representative example. Other step orders may be implemented to meet the criteria of a particular application.

The battery controller 66 may begin the fail-safe battery power management method 200 in the step 202. A check may be made in the decision step 204 to determine if a problem (e.g., weaker) cell is detected. The decision step 204 may include sending a status request from the battery controller 66 to the voltage current temperature module 110, the voltage current temperature module 110 measuring the cell voltages of individual cells 152a-152n, and returning the cell voltages to the battery controller 66. If no problem cell is detected, the fail-safe battery power management method 200 may loop back to a start of step 202 and wait for a next checking period. If a problem cell (e.g., 152p) is detected, a check may be performed in the decision step 206 to determine if the detected problem cell 152p is at risk of being a drooping cell with a larger voltage drop. If the detected problem cell 152p is not a drooping cell (e.g., the problem cell 152p is a weak cell), the battery controller 66 may execute a routine (e.g., code, software, firmware, instructions, etc.) in the step 208 to perform a controlled power derate of the battery pack 70 based on the problem cell 152p remaining active within the battery pack 70. Thereafter, the fail-safe battery power management method 200 may finish at the step 210.

If the detected problem cell 152p is at risk of being a drooping cell (e.g., a drooping cell 152d) per the decision step 206, a check may be performed in the decision step 212 to determine if the voltage drooping is an intermittent drooping. If the voltage drooping is not intermittent, the fail-safe battery power management method 200 may continue with the decision step 220 to check if the cell isolation switches (FIG. 9, 242a-242n) corresponding to the drooping cell 152d are operational. If the voltage drooping is intermittent, a check may be performed at the decision step 214 to determine if the corresponding cell isolation switches are operational. If the corresponding cell isolation switches are not operational (e.g., the switches have failed), the fail-safe battery power management method 200 may continue with the step 208 to derate the battery pack 70 based on the drooping cell 152d remaining active in the battery pack 70. If the corresponding isolation switches are working, the method may continue with the step 216.

In the step 216, the battery controller 66 may command that cell isolation switches corresponding to the detected drooping cell 152d be opened to isolate the detected drooping cell 152d from the battery pack 70. In various embodiments, the isolation of the drooping cell 152d may be performed for an amount of time. The amount of time may be calibration dependent. After the time has elapsed, the corresponding isolation switches may be closed by the battery controller 66 in the step 218. Closing the corresponding isolation switches generally rejoins the drooping cell 152d back into the battery pack 70. The fail-safe battery power management method 200 may subsequently return to the step 202 to check if other problems cells are detected.

In the decision step 220, the battery controller 66 may check if the isolation switches associated with the drooping cell 152d are working. If the associated isolation switches are not working, the fail-safe battery power management method 200 may continue with the step 208 to derate the battery pack 70 based on the drooping cell 152d remaining active in the battery pack 70. If the isolation switches are working, the associated isolation switches may be opened in the step 222 to isolate the drooping cell 152d from the battery pack 70. Thereafter, the battery controller 66 may set a flag in the step 224. The set flag generally indicates that the vehicle 60 may be taken in for replacement of the isolated drooping cell 152d and install a new cell into the battery pack 70. The fail-safe battery power management method 200 may return to the step 202 to check for additional problem cells.

Figure 9:
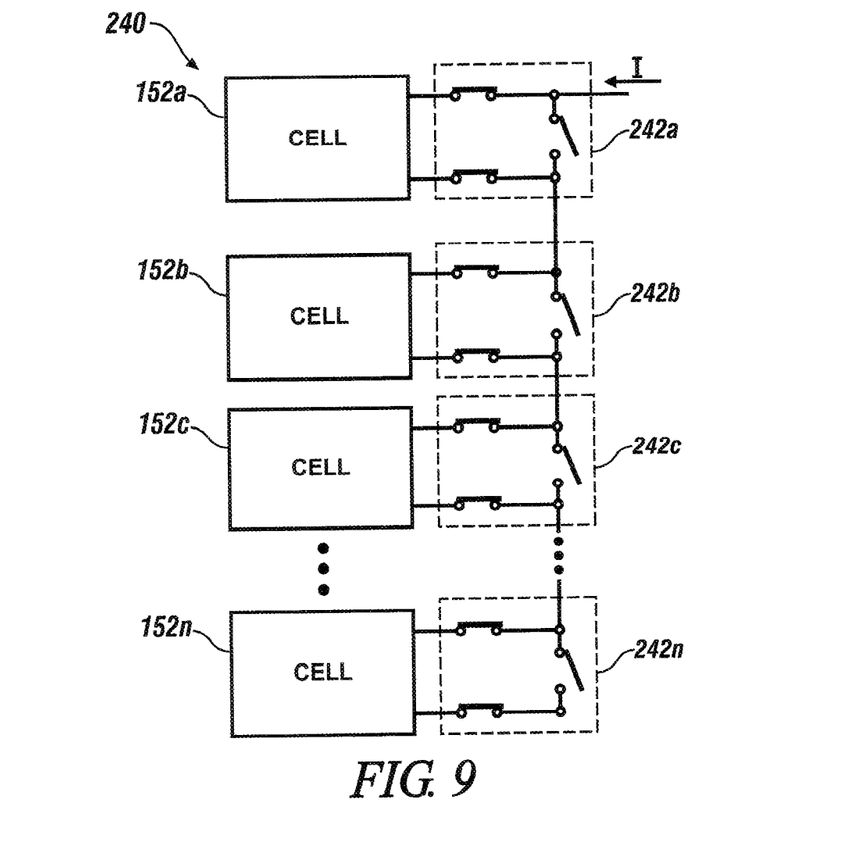
FIG. 9 is a schematic diagram of cell isolating switches in a normal state in accordance with an exemplary embodiment.

Referring to FIG. 9, a schematic diagram of an example implementation of cell isolating switches in a normal state 240 is shown in accordance with an exemplary embodiment. The battery pack 70 generally comprises multiple isolation switch sets 242a-242n. The isolation switch sets 242a-242n may be electrically connected to the cells 152a-152n, respectively. Individual isolation switch sets 242a-242n generally comprise multiple (e.g., three) switches S1, S2 and S3. The switches S1, S2 and S3 may be controlled by the battery controller 66.

The switch S1 may be a terminal switch electrically connected in series with one of the cell terminals (e.g., a positive cell terminal). The switch S2 may be another terminal switch electrically connected in series with the other cell terminal (e.g., a negative cell terminal). The switch S3 may be a bridge switch electrically connected between nodes of the terminal switches S1 and S2 opposite the respective cell 152a-152n. In the normal state 240, the terminal switches S1 and S2 in the isolation switch sets 242a-242n may be in a closed state (or conducting mode). The bridge switches S3 may be in an open state (or an isolating mode). As such, the current signal I may flow through the terminal switches S1, the terminal switches S2 and the cells 152a-152n in series.

In various embodiments, one of the terminal switches S1 or S2 may be eliminated from a design. Having both terminal switches S1 and S2 in a design may result in a higher reliability since a failure of either terminal switch S1 or S2 to transition to the open state may not prevent the respective cell 152a-152n from becoming electrically isolated from the battery pack 70. In various embodiments, the switches S1, S2 and S3 may be implemented as a power metal-oxide-silicon field effect transistors (MOSFETs), power insulated gate bipolar transistors (IGBTs), power silicon carbine switches, power gallium nitride switches, mechanical switches or other suitable power switches.

Figure 10:
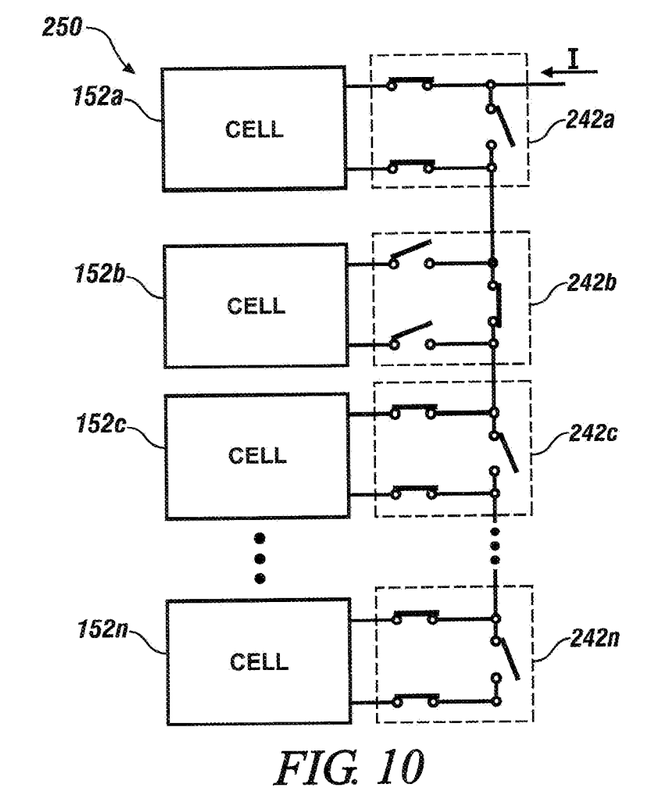
FIG. 10 is a schematic diagram of the cell isolating switches in an isolated state in accordance with an exemplary embodiment.

Referring to FIG. 10, a schematic diagram of an example implementation of the cell isolating switches in an isolated state 250 is shown in accordance with an exemplary embodiment. In the example, the battery controller 66 has determined that one of the cells (e.g., 152b) should be electrically isolated from the battery pack 70. Therefore, the battery controller 66 may command the terminal switches S1 and S2 in the isolation switch set 242b into the open state to electrically isolate the bad cell 152b. The battery controller 66 may simultaneously or subsequently command the bridge switch S3 in the isolation switch set 242b into the closed state to allow the current signal I to flow around the bad cell 152b. With the isolation switch set 242b in the isolated state 250, the battery pack 70 may continue operation with N−1 cells (e.g., cells 152a and 152c-152n) available. Similar isolation mechanism may be applied to isolate a malfunction module if the cells 152a-152n are considered as a module.

Figure 11:
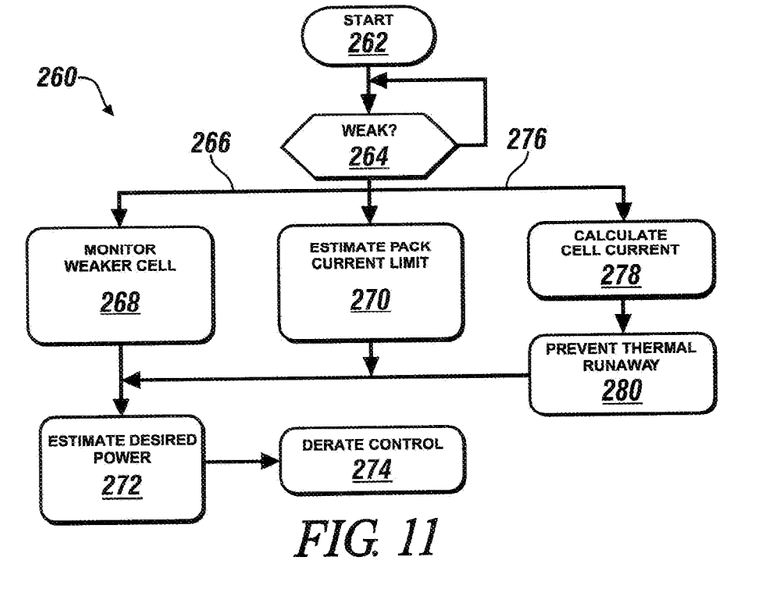
FIG. 11 is a schematic flow diagram of a method for battery power management in accordance with an exemplary embodiment.

Referring to FIG. 11, a schematic flow diagram of an example implementation of a method 260 for battery power management is shown in accordance with an exemplary embodiment. The battery power management method (or process) 260 may be implemented in the battery pack 70, the voltage current temperature module 110 and the battery controller 66. The battery power management method 260 generally comprises a step 262, a decision step 264, a path 266, a step 268, a step 270, a step 272, a step 274, a path 276, a step 278, and a step 280. The sequence of steps/paths 262 to 280 is shown as a representative example. Other step/path orders may be implemented to meet the criteria of a particular application.

The battery controller 66 may begin the battery power management method 260 at the step 262. A check may be made in the decision step 264 to determine if a problem cell is detected. The decision step 264 may include sending a status request from the battery controller 66 to the voltage current temperature module 110, the voltage current temperature module 110 measuring the cell voltages of the individual cells, and returning the cell voltages to the battery controller 66. If no problem cell is detected, the battery power management method 260 may loop back to a start of step 262 and wait for a next checking period. If a problem cell is detected, the battery power management method 260 may proceed based on the type of problem cell that was detected.

If the problem cell (e.g., 152j) is a weaker cell, the battery power management method 260 may follow the path 266. In the step 268, the battery controller 66 may monitor the weaker cell 152j and calculate a cell current limit (e.g., $I_{cL}$) and a cell voltage limit (e.g., $V_{cL}$) for the weaker cell 152j from an estimated cell model and operating conditions. The monitoring may include a state of charge (e.g., SOC(j)), a capacity (e.g., Cap(j)), and/or a state of health (e.g., SOH(j)) using standard techniques. The estimated cell model for a j-th cell (e.g., a cell 152j) may be expressed by formulae 3 and 4 as follows:

$$\dot{x}_{k+1} = A_k x_k + B_k u_k \tag{3}$$

$$y_k = C_k x_k \tag{4}$$

Where the parameters $\dot{x}$, x, y, u, A, B and C are dependent on the type of technology implemented in the cell being monitored, and subscript-k represents the k-th sample time.

The cell current limit $I_{cL}$ and cell voltage limit $V_{cL}$ for the weaker cell 152j may be estimated from the cell model and one or more operating conditions.

In the step 270, the battery controller 66 may estimate a pack current limit (e.g., $I_{pL}$) and a pack voltage limit (e.g., $V_{pL}$) based on an estimated pack model. The estimated pack model may be defined as a total number of cells lumped together or excluding the weaker cell 152j. The estimated pack model may be expressed by formulae 5 and 6 as follows:

$$\dot{z}_{k+1} = F_k z_k + G_k u_k \tag{5}$$

$$y_k = H_k z_k \tag{6}$$

Where the parameters $\dot{z}$, z, y, u, F, G and H are dependent on the type of battery pack 70 being monitored.

In the step 272, the battery controller 66 may estimate a desired battery power (e.g., $P_w$) based on new current limits and new voltage limits derived from the weaker cell 152j. The desired current (e.g., $I_L$) may be calculated by formula 7 as follows:

$$I_L = \min(I_{cL}, I_{pL}) \tag{7}$$

Since the current limit of the weaker cell 152j is usually a smaller value than the current limit of the battery pack 70, formula 7 may be approximated per formula 8 as follows:

$$I_L = I_{cL} \tag{8}$$

The desired voltage $V_L$ may be calculated in a similar fashion. The desired current $I_L$, the desired voltage $V_L$ and the desired battery power $P_w$ may be used in the step 274 to derate the power available to the vehicle 60.

If the problem cell is a drooping cell (e.g., the output cell voltage of the cell 152d is drooping in a large degree), the battery power management method 260 may follow the path 276. In the step 278, the battery controller 66 may monitor the problem cell 152d and calculate the cell current limit $I_{cL}$ and the cell voltage limit $V_{cL}$ for the problem cell 152d from an estimated cell model and operating conditions. The monitoring may include a state of charge (e.g., SOC(d)) and a capacity (e.g., Cap(d)). The estimated cell model for the problem cell 152d may be expressed by formulae 3 and 4 as shown before.

In step 280, the cell current limit $I_{cL}$ and the cell voltage limits $V_{cL}$ for the drooping cell 152d may be calculated to prevent thermal runaway. The cell current limit $I_{cL}$ and the cell voltage limits $V_{cL}$ for the drooping cell 152d may be calculated based on the cell state, a cell thermal model and a cell heat release limit derived from thermal runaway boundary conditions. The cell thermal model and the cell heat release limit may be dependent on a configuration and chemistry of the particular drooping cell 152d within the battery pack 70.

Once the cell current limit $I_{cL}$ and the cell voltage limits $V_{cL}$ for the drooping cell 152d have been determined, the battery power management method 260 may continue with the step 272 to estimate the desired battery power based on the limits of the drooping cell 152d. The desired battery power may subsequently be used in the step 274 to derate the power available to the vehicle 60.

Figure 12:
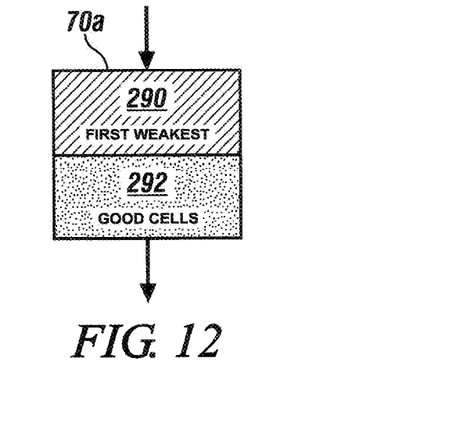
FIG. 12 is a schematic diagram of a first battery pack with a single problem cell in accordance with an exemplary embodiment.

Referring to FIG. 12, a schematic diagram of an example first battery pack 70a with a single problem cell is shown in accordance with an exemplary embodiment. The first battery pack 70a may be a variation of the battery pack 70 with a problem cell present in the pack. In the example, a first weakest cell 290 may represent a weakest cell within the N-cell first battery pack 70a. Although the first weakest cell 290 is shown at an end of the first battery pack 70a, the first weakest cell 290 may be located throughout the first battery pack 70a. The remaining cells (e.g., the N−1 good cells) of the first battery pack 70a may be illustrated by a first block 292. The first block 292 generally represents the N−1 good cells and excludes the first weakest cell 290. For example, in a ninety-six cell battery pack 70a, the first block 292 may represent ninety-five cells. During operations, the battery controller 66 may be operational to identify and, if appropriate, isolate the first weakest cell 290.

Figure 13:
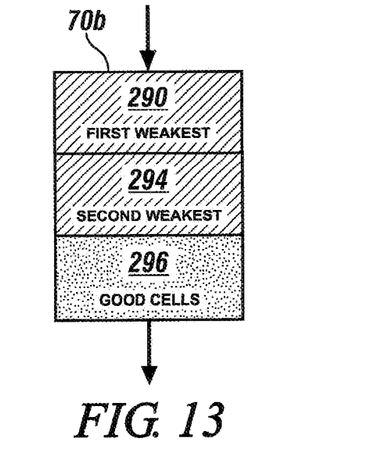
FIG. 13 is a schematic diagram of a second battery pack with multiple problem cells in accordance with an exemplary embodiment

Referring to FIG. 13, a schematic diagram of an example second battery pack 70b with a multiple problem cells is shown in accordance with an exemplary embodiment. The second battery pack 70b may be a variation of the battery pack 70 with several problem cells. In the example, the cell 290 may represent the first weakest cell 290 within the second battery pack 70b. A cell 294 may represent a second weakest cell within the second battery pack 70b. Although the first weakest cell 290 and the second weakest cell 294 are shown as adjoining neighbors, the weakest cell 290 and the weakest cell 294 may be located throughout the second battery pack 70b. The remaining cells of the second battery pack 70b may be illustrated by a second block 296. The second block 296 generally represents the N−2 good cells and excludes the first weakest cell 290 and the second weakest cell 294. For example, in a ninety-six cell battery pack 70b, the second block 296 may represent ninety-four cells. During operations, the battery controller 66 may be operational to identify and, if appropriate, isolate the first weakest cell 290 and the second weakest cell 294.

Figure 14:
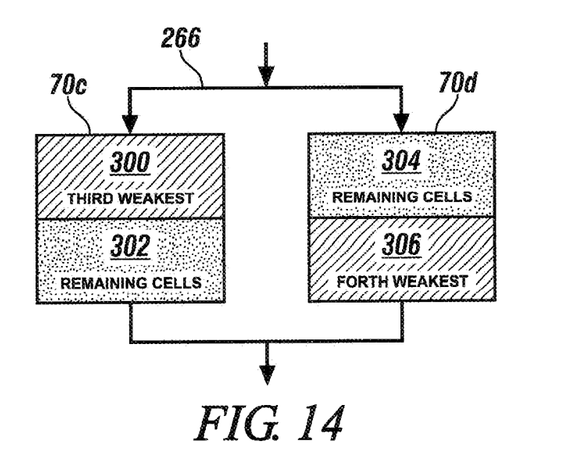
FIG. 14 is a schematic diagram of a dual battery pack configuration in accordance with an exemplary embodiment.

Referring to FIG. 14, a schematic diagram of an example dual battery pack configuration is shown in accordance with an exemplary embodiment. In the example, a third battery pack 70c may include a third weakest cell 300 and the first remaining cells 302. A fourth battery pack 70d may include a fourth weakest cell 306 and the second remaining cells 304. The third battery pack 70c and the fourth battery pack 70d may be variations of the battery pack 70 with at least one problem cell per pack. The third battery pack 70c and the fourth battery pack 70d may be electrically connected in parallel to form the dual pack. During operation, the battery controller 66 may be operational to detect and, if appropriate, isolate the third weakest cell 300 from the third battery pack 70c. The battery controller 66 may also be operational to detect and, if appropriate, isolate the fourth weakest cell 306 from the fourth battery pack 70d independent of detecting and/or isolating the third weakest cell 300.

Figure 15:
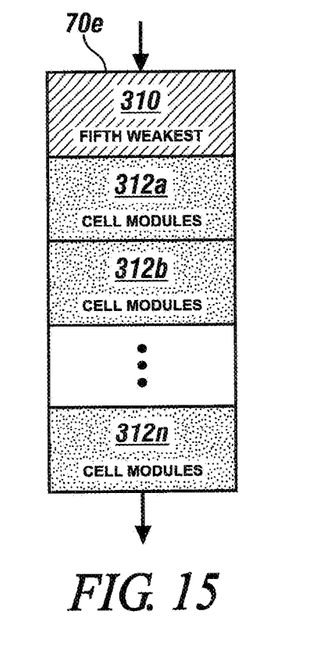
FIG. 15 is a schematic diagram of a modular-based battery pack in accordance with an exemplary embodiment.

Referring to FIG. 15, a schematic diagram of an example modular-based fifth battery pack 70e is shown in accordance with an exemplary embodiment. The modular-based fifth battery pack 70e may be a variation of the battery pack 70 with one or more problem cells. The modular-based fifth battery pack 70e is shown with a fifth weakest cell 310 and multiple cell modules 312a-312n. Individual ones of the cell modules 312a-312n generally comprise multiple (e.g., 8-16) cells. If for example, the original manufactured module 312a contains 10 cells, and one cell is weak (e.g., the fifth weakest cell 310), the module 312a may be re-defined by the remaining 9 healthy cells. During operation, the battery controller 66 may be operational to detect and, if appropriate, isolate the fifth weakest cell 310 from the modular-based fifth battery pack 70e.

Consider a power prediction discharging case with minimum voltage limits on the weaker cell and a battery pack 70, 70a, 70b, 70c, 70d and/or 70e. Given minimum voltage limits, the battery controller 66 may calculate allowable currents based on the weaker cell, and subsequently calculate one or more allowed full pack current limits. Often the minimum current between the weaker cell and the pack may be established by the weaker cell current limit.

For a single battery pack (e.g., first battery pack 70a in FIG. 12), the maximum allowable pack discharge current (e.g., $I_{pc1max,k}$) at sample time k may be calculated by formula 9 as follows:

$$I_{pc1max,k} = \min(I_{c1k}(V_{cL1,min}), J_{p1k}(V_{pL1,min})) \quad (9)$$

Where $I_{c1k}$ is the current through the weakest cell as a function of cell voltage during the discharge, $V_{cL1,min}$ is a minimum voltage across the weakest cell during the discharge (e.g., a smaller discharge voltage generally results in a larger discharge current), $I_{p1k}$ is the current through the battery pack 70 as a function of pack voltage during the discharge, and $V_{pL1,min}$ is the minimum voltage across the battery pack 70 during the discharge. Since the weakest cell generally has the smallest current allowed during the discharge, formula 9 may be approximated per formula 10 as follows:

$$I_{pc1max,k} = I_{c1k}(V_{cL1,min}) \quad (10)$$

Using the new current limits, the battery controller 66 may predict the weaker cell voltages using a cell model of the weaker cell per formulae 11 and 12 as follows:

$$\dot{x}_{k+1} = A_k x_k + B_k I_{pc1max,k} \quad (11)$$

$$V_{c1,k} = C_k x_k \quad (12)$$

The battery controller 66 may also predict the battery pack voltages (e.g., for an (N−1)-cell pack or an N-cell pack) using a model of the battery pack per formulae 13 and 14 as follows:

$$\dot{z}_{k+1} = F_k z_k + G_k I_{pc1max,k} \quad (13)$$

$$V_{p1,k} = H_k z_k \quad (14)$$

The full battery pack voltage (e.g., $V_{pc1,k}$) may be a sum of the two voltages and calculated per formula 15 as follows:

$$V_{pc1,k} = V_{c1,k}(I_{pc1max,k}) + V_{p1,k}(I_{pc1max,k}) \quad (15)$$

A power for the full battery pack 70 may be estimated by the battery controller 66 using formula 16 as follows:

$$P_{pc1,k} = (I_{pc1max,k} \times V_{c1,k}) + (I_{pc1max,k} \times V_{p1,k}), \text{ or}$$

$$P_{pc1,k} = I_{pc1max,k} \times V_{pc1,k} \quad (16)$$

Since the cell voltage $V_{c1,k}$ is generally small compared to the pack voltage $V_{p1,k}$, formula 16 may be approximated per formula 17 as follows:

$$P_{pc1,k} = I_{pc1max,k} \times V_{p1,k} \quad (17)$$

For a dual battery pack (e.g., battery packs 70c and 70d in FIG. 14), the battery controller 66 may calculate the maximum allowable pack discharge current separately for the two power packs (e.g., Pack 1 and Pack 2). The calculations may be provided by formula 10 for the first pack and formula 18 for the second pack as follows:

$$I_{pc2max,k} = \min(I_{c2k}(V_{cL2,min}), J_{p2k}(V_{pL2,min})) \quad (18)$$

Since the weakest cell in the second battery pack generally has the smallest current allowed during the discharge, formula 18 may be approximated per formula 19 as follows:

$$I_{pc2max,k} = I_{c2k}(V_{cL2,min}) \quad (19)$$

The full battery pack voltage (e.g., $V_{pc2,k}$) may be a sum of the two voltages and calculated per formula 20 as follows:

$$V_{pc2,k} = V_{c2,k}(I_{pc2max,k}) + V_{p2,k}(I_{pc2max,k}) \quad (20)$$

With the two battery packs operating in parallel, the dual pack voltage across both battery packs may be the same. The minimum common voltage (e.g., $V_{min,k}$) may be calculated by formula 21 as follows:

$$V_{min,k} = \max(V_{pc1,k}, V_{pc2,k}) \quad (21)$$

The max operator may be used in formula 21 because a higher discharge voltage generally results in less discharge current. The discharge currents of both battery packs may be recalculated with the new minimum common voltage limit per formulae 22 and 23 as follows:

$$I_{pc1max,k} = I_{pc1,k}(V_{min,k}) \quad (22)$$

$$I_{pc2max,k} = I_{pc2,k}(V_{min,k}) \quad (23)$$

The battery controller 66 may estimate the total system power (e.g., $P_k$) using formula 24 as follows:

$$P_k = (I_{pc1max,k} \times V_{min,k}) + (I_{pc2max,k} \times V_{min,k}) \quad (24)$$

The total system power $P_k$ may be estimated over various defined time intervals (e.g., 0.2 seconds, 2 seconds, 10 seconds, 20 seconds, etc.). For a given full pack voltage, the pack current may be predicted by excluding the one or more weaker cells.

Figure 16:
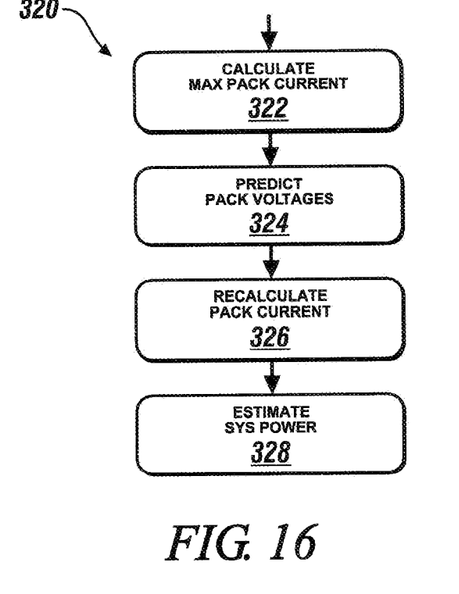
FIG. 16 is a schematic flow diagram of a method for power prediction in a charging case with given maximum voltage limits for the weak cells and the packs in accordance with an exemplary embodiment.

Referring to FIG. 16, a schematic flow diagram of an example implementation of a method 320 for first power prediction in a charging case, with given maximum voltage limits for the weak cells and the packs, is shown in accordance with an exemplary embodiment. The first power prediction method (or process) 320 may be implemented in the battery controller 66. The first power prediction method 320 generally comprises a step 322, a step 324, a step 326, and a step 328. The sequence of steps 322 to 328 is shown as a representative example. Other step orders may be implemented to meet the criteria of a particular application.

In the step 322, the allowed maximum pack current limit for an N-cell pack may be calculated per formulae 9 (or 10) and 18 (or 19) using the given maximum charging voltage limits $V_{cL1,max}$, $V_{cL2,max}$, $V_{pL1,max}$, $V_{pL2,max}$. The battery controller 66 may predict the pack voltages in the step 324 using the newly calculated pack current limits. For a dual pack system, the individual pack voltages (e.g., $V_{pc1,k}$ and $V_{pc2,k}$) may be calculated per formulae 25 and 26 as follows:

$$V_{pc1,k} = V_{pc1,k}(I_{pc1max,k}) \quad (25)$$

$$V_{pc2,k} = V_{pc2,k}(I_{pc2max,k}) \quad (26)$$

For the dual pack case, the new maximum charging voltage (e.g., $V_{max,k}$) across the common nodes may be determined per formula 27 as follows:

$$V_{max,k} = \min(V_{pc1,k}, V_{pc2,k}) \quad (27)$$

The min operator may be used in formula 27 to avoid overstressing the weakest cells during the charging.

In step 326, the individual battery pack currents may be re-calculated with the new maximum common voltage per formulae 25 and 26 as follows:

$$I_{pc1max,k} = I_{pc1,k}(V_{max,k}) \quad (28)$$

$$I_{pc2max,k} = I_{pc2,k}(V_{max,k}) \quad (29)$$

The total system power may be estimated in the step 328 per formula 30 as follows:

$$P_k = (I_{pc1max,k} \times V_{max,k}) + (I_{pc2max,k} \times V_{max,k}) \quad (30)$$

The total system power may be estimated over various defined time intervals (e.g., 0.2 seconds, 2 seconds, 10 seconds, 20 seconds, etc.).

Figure 17:
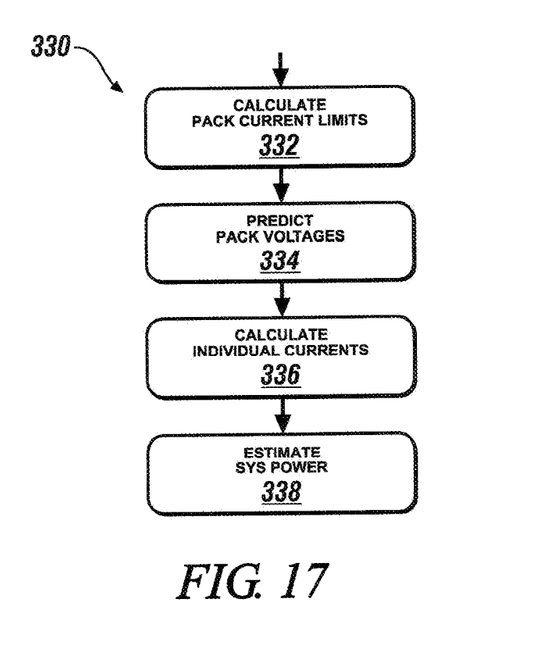
FIG. 17 is a schematic flow diagram of a method for power prediction in a discharging case with maximum discharge current limits on weaker or drooping cells and packs in accordance with an exemplary embodiment.

Referring to FIG. 17, a schematic flow diagram of an example implementation of a method 330 for second power prediction in a discharging case with maximum discharge current limits on weaker or drooping cells and packs is shown in accordance with an exemplary embodiment. The second power prediction method (or process) 330 may be implemented in the battery controller 66. The second power prediction method 330 generally comprises a step 332, a step 334, a step 336, and a step 338. The sequence of steps 332 to 338 is shown as a representative example. Other step orders may be implemented to meet the criteria of a particular application.

The second power prediction method 330 may be applied in situations where the maximum discharge current limits of the weakest cells and packs are known. In the step 332, the battery controller 66 may calculate the pack current limits (e.g., $I_{pc1max,k}$ and $I_{pc2max,k}$) from the individual current limits specified for the problem (e.g., weaker or drooping) cell (e.g., $I_{cL1,max}$ and $I_{cL2,max}$) and the (N−1)-cell pack (e.g., $I_{pL1,max}$ and $I_{pL2,max}$). The maximum pack discharging currents $I_{pc1max,k}$ and $I_{pc2max,k}$ may be calculated per formulae 31 and 32 as follows:

$$I_{pc1max,k} = \min(I_{cL1,max}, I_{pL1,max}) \quad (31)$$

$$I_{pc2max,k} = \min(I_{cL2,max}, I_{pL2,max}) \quad (32)$$

The battery controller 66 may predict the pack voltages in the step 334 using the newly calculated pack current limits. For a dual pack system (see FIG. 14), the individual pack voltages $V_{pc1,k}$ and $V_{pc2,k}$ may be calculated per formulae 25 and 26.

For the dual pack case, the minimum discharging voltage (e.g., $V_{min,k}$) across the common nodes may be determined per formula 33 as follows:

$$V_{min,k} = \max(V_{pc1,k}, V_{pc2,k}) \quad (33)$$

The max operator may be used in formula 33 to avoid overstressing the weakest cells during the discharging.

In step 336, the individual battery pack currents may be calculated with the new minimum common voltage per formulae 34 and 35 as follows:

$$I_{pc1max,k} = I_{pc1,k}(V_{min,k}) \quad (34)$$

$$I_{pc2max,k} = I_{pc2,k}(V_{min,k}) \quad (35)$$

The total system power may be estimated in the step 338 per formula 36 as follows:

$$Pk = (I_{pc1max,k} \times V_{min,k}) + (I_{pc2max,k} \times V_{min,k}) \quad (36)$$

The total system power may be estimated over the various defined time intervals (e.g., 0.2 seconds, 2 seconds, 10 seconds, 20 seconds, etc.).

Figure 18:
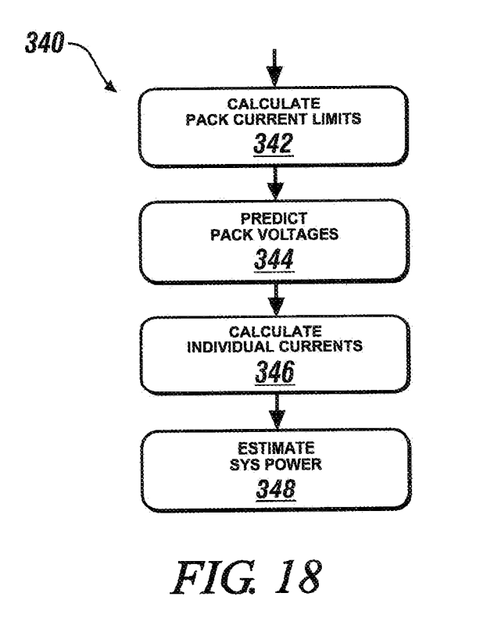
FIG. 18 is a schematic flow diagram of a method for power prediction in another charging case with given maximum charging current limits on weaker or drooping cells and packs in accordance with an exemplary embodiment.

Referring to FIG. 18, a schematic flow diagram of an example implementation of a method 340 for third power prediction in another charging case with given maximum charging current limits on weaker or drooping cells and packs is shown in accordance with an exemplary embodiment. The third power prediction method (or process) 340 may be implemented in the battery controller 66. The third power prediction method 340 generally comprises a step 342, a step 344, a step 346, and a step 348. The sequence of steps 342 to 348 is shown as a representative example. Other step orders may be implemented to meet the criteria of a particular application.

The third power prediction method 340 may be applied in situations where the maximum charging current limits of the weakest cells are known. In the step 342, the battery controller 66 may calculate the pack current limits $I_{pc1max,k}$ and $I_{pc2max,k}$ based on formulae 31 and 32. The battery controller 66 may predict the pack voltages in the step 344 using the newly calculated pack current limits. For a dual pack system, the individual pack voltages $V_{pc1,k}$ and $V_{pc2,k}$ may be calculated per formulae 25 and 26.

For the dual pack case, the maximum charging voltage $V_{max,k}$ across the common nodes may be determined per formula 27. In step 346, the individual battery pack currents may be calculated with the new maximum common voltage per formulae 28 and 29. The total system power may be estimated in the step 348 per formula 30. The total system power may be estimated over the various defined time intervals (e.g., 0.2 seconds, 2 seconds, 10 seconds, 20 seconds, etc.).

Embodiments of the disclosure generally apply thresholds in a detection chart to the multiple arrays of cell voltage differences to detect weaker cells and/or drooping cells. A distributed battery system model using weaker cell limits and reduced pack state estimations may be applied to prevent damage to the problem cells and thus the battery pack. In various embodiments, single battery pack total system power may be estimated with the constraint of one or more problem cells. In other embodiments, multiple battery pack total system power may be estimated with the constraints of the one or more problem cells.

Embodiments of the disclosure may provide fault tolerant control of electric vehicles with degraded cells through isolation of the problem cells or a vehicle power derate. Such a realistic power estimation may expand the battery pack life, prevent overloading the weaker cell and/or the drooping cell. The power estimation may further reduce a probability of damaging the battery packs, causing walk home conditions and/or causing thermal runaway conditions. The power estimation may also safely derate the vehicle under the cell fault conditions.

While the best modes for carrying out the disclosure have been described in detail, those familiar with the art to which this disclosure relates will recognize various alternative designs and embodiments for practicing the disclosure within the scope of the appended claims.

What is claimed is:

1. A distributed battery power system comprising:
a battery pack having:
a plurality of cells configured to generate a plurality of cell voltages;
a voltage current temperature module electrically connected to the plurality of cells;
a plurality of isolation switch sets electrically connected between the plurality of cells, wherein each of the plurality of isolation switch sets has at least two switches directly connected together, at least one of the two switches is directly connected to a corresponding one of the plurality of cells, and the plurality of cells are electrically connected in series through the plurality of isolation switch sets while in a normal state; and
a battery controller in communication with the voltage current temperature module, and operable to:
send a status request to the voltage current temperature module;
receive the plurality of cell voltages from the voltage current temperature module in response to the status request;
determine if the plurality of cells includes one or more problem cells in response to the plurality of cell voltages; and
perform one or more actions in response to determining that the one or more problem cells are present, wherein the one or more actions are one or more of limiting a charging current and a discharging current, and preventing the charging current and the discharging current from flowing through the one or more problem cells, and wherein the one or more problem cells include at least one drooping cell, and the at least one drooping cell is detected in response to a difference between neighboring cell voltages exceeding a standard deviation threshold as a function of time.

2. The distributed battery power system according to claim 1, wherein the one or more problem cells include at least one weak cell, and the at least one weak cell is detected based on one or more of a state of charge, a capacity and a state of health of the at least one weak cell.

3. The distributed battery power system according to claim 1, wherein the battery controller is further operable to estimate a total power available from the battery pack while the one or more problem cells are electrically active in the battery pack.

4. The distributed battery power system according to claim 1, wherein the battery controller is further operable to:
estimate a safe current limit and one or more safe voltage limits of the one or more problem cells based on a cell model; and
estimate a total power available from the battery pack based on the safe current limit and the one or more safe voltage limits.

5. The distributed battery power system according to claim 1, wherein the battery pack is one of a single battery pack or comprises two battery packs electrically connected in parallel.

6. The distributed battery power system according to claim 1, wherein one of the one or more actions is controlling the plurality of isolation switch sets to electrically isolate the one or more problem cells from the battery pack to prevent the charging current and the discharging current from flowing through the one or more problem cells.

7. The distributed battery power system according to claim 1, wherein one of the one or more actions is derating the battery pack to limit the charging current and the discharging current flowing through the one or more problem cells.

8. The distributed battery power system according to claim 1, wherein the battery pack and the battery controller are mountable in a vehicle.

9. A method for monitoring a distributed battery power system comprising:
sending a status request from a battery controller to a battery pack, wherein the battery pack has:
a plurality of cells configured to generate a plurality of cell voltages;
a voltage current temperature module electrically connected to the plurality of cells; and
a plurality of isolation switch sets electrically connected between the plurality of cells, wherein each of the plurality of isolation switch sets has at least two switches directly connected together, at least one of the two switches is directly connected to a corresponding one of the plurality of cells, and the plurality of cells are electrically connected in series through the plurality of isolation switch sets while in a normal state;

receiving the plurality of cell voltages at the battery controller from the voltage current temperature module in response to the status request;

determining in the battery controller if the plurality of cells includes one or more problem cells in response to the plurality of cell voltages; and performing one or more actions in response to determining that the one or more problem cells are present, wherein the one or more actions are one or more of limiting a charging current and a discharging current, and preventing the charging current and the discharging current from flowing through the one or more problem cells, and wherein the one or more problem cells include at least one drooping cell, and the at least one drooping cell is detected in response to a difference between neighboring cell voltages exceeding a standard deviation threshold as a function of time.

10. The method according to claim 9, wherein the one or more problem cells include at least one weak cell, and the at least one weak cell is detected based on one or more of a state of charge, a capacity and a state of health of the at least one weak cell.

11. The method according to claim 9, further comprising:
estimating in the battery controller a total power available from the battery pack while the one or more problem cells are electrically active in the battery pack.

12. The method according to claim 9, further comprising:
estimating a safe current limit and one or more safe voltage limits of the one or more problem cells based on a cell model; and
estimating a total power available from the battery pack based on the safe current limit and the one or more safe voltage limits.

13. The method according to claim 9, wherein the battery pack is one of a single battery pack or comprises two battery packs electrically connected in parallel.

14. The method according to claim 9, wherein one of the one or more actions is controlling the plurality of isolation switch sets to electrically isolate the one or more problem cells from the battery pack to prevent the charging current and the discharging current from flowing through the one or more problem cells.

15. The method according to claim 9, wherein one of the one or more actions is derating the battery pack to limit the charging current and the discharging current flowing through the one or more problem cells.

16. The method according to claim 9, wherein the method is performed in a vehicle.

17. A vehicle comprising:
a battery pack having:
a plurality of cells configured to generate a plurality of cell voltages;
a voltage current temperature module electrically connected to the plurality of cells; and
a plurality of isolation switch sets electrically connected between the plurality of cells, wherein each of the plurality of isolation switch sets has at least two switches directly connected together, at least one of the two switches is directly connected to a corresponding one of the plurality of cells, and the plurality of cells are electrically connected in series through the plurality of isolation switch sets while in a normal state;

a motor powered by the battery pack, and operable to propel the vehicle; and a battery controller in communication with the voltage current temperature module, and operable to:
send a status request to the voltage current temperature module;
receive the plurality of cell voltages from the voltage current temperature module in response to the status request;
determine if the plurality of cells includes one or more problem cells in response to the plurality of cell voltages; and
perform one or more actions in response to determining that the one or more problem cells are present, wherein the one or more actions are one or more of limiting a charging current and a discharging current, and preventing the charging current and the discharging current from flowing through the one or more problem cells, and wherein the one or more problem cells include at least one drooping cell, and the at least one drooping cell is detected in response to a difference between neighboring cell voltages exceeding a standard deviation threshold as a function of time.

18. The vehicle according to claim 17, wherein:
a first of the one or more actions is controlling the plurality of isolation switch sets to electrically isolate the one or more problem cells from the battery pack to prevent the charging current and the discharging current from flowing through the one or more problem cells; and
a second of the one or more actions is derating the battery pack to limit the charging current and the discharging current flowing through the one or more problem cells.

19. The vehicle according to claim 17, wherein the battery controller is further operable to estimate a total power available from the battery pack while the one or more problem cells are electrically active in the battery pack.

20. The vehicle according to claim 17, wherein the battery controller is further operable to:
estimate a safe current limit and one or more safe voltage limits of the one or more problem cells based on a cell model; and
estimate a total power available from the battery pack based on the safe current limit and the one or more safe voltage limits.

* * * * *